United States Patent [19]

Ebner

[11] Patent Number: 4,503,078

[45] Date of Patent: Mar. 5, 1985

[54] PROCESS FOR THE PRODUCTION OF VINEGAR WITH MORE THAN 12 GMS/100 ML ACETIC ACID

[75] Inventor: Heinrich Ebner, Linz, Austria

[73] Assignee: Heinrich Frings GmbH & Co. Kg, Bonn, Fed. Rep. of Germany

[21] Appl. No.: 355,923

[22] Filed: Mar. 8, 1982

[51] Int. Cl.$^3$ .............................................. C12J 1/00
[52] U.S. Cl. ................................................. 426/17
[58] Field of Search ......................................... 426/17

[56] References Cited

U.S. PATENT DOCUMENTS

| | | | |
|---|---|---|---|
| 2,707,683 | 5/1955 | Hromatka et al. | 426/17 |
| 2,997,424 | 8/1961 | Mayer | 426/17 |
| 3,445,245 | 5/1969 | Ebner | 426/17 |
| 4,076,844 | 2/1978 | Ebner et al. | 426/17 |
| 4,364,960 | 12/1982 | Kunimatsu et al. | 426/17 |

Primary Examiner—Raymond Jones
Assistant Examiner—Marianne S. Minnick
Attorney, Agent, or Firm—Norbert P. Holler

[57] ABSTRACT

A process for the production of vinegar with an acetic acid concentration of more than 12 grams per 100 milliliters of vinegar, by means of a single-stage submerged fermentation of alcohol-containing mashes in a series of successive fermentation periods. In each such period, a quantity of finished vinegar constituting between about 20% and less than 40% of the contents of the fermentation tank and having the requisite acetic acid concentration is extracted from the fermentation tank and replaced by a like quantity of fresh mash having an acetic acid concentration of up to 2 g/100 ml and an alcohol concentration of more than 10 volume percent, in such a manner that the starting concentrations in the tank for each of the successive fermentation periods are more than 9 g/100 ml but less than 13 g/100 ml acetic acid and correspondingly less than 4 vol. % but more than 2.5 vol. % alcohol. In a refinement of the process, a maximum hourly increase in acidity of between about 0.17 g/100 ml and about 0.21 g/100 ml is maintained during each fermentation period.

1 Claim, No Drawings

PROCESS FOR THE PRODUCTION OF VINEGAR WITH MORE THAN 12 GMS/100 ML ACETIC ACID

This invention relates to a process for the production of vinegar with an acetic acid concentration of more than 12 grams per 100 milliliters of vinegar by means of a single-stage submerged fermentation of alcohol-containing mashes in consecutive fermentation periods, in each of which a quantity of the finished vinegar is extracted from the fermentation tank and is replaced by a like quantity of fresh mash with an acetic acid concentration of up to 2 g/100 ml and an alcohol concentration of more than 10 volume percent. Generally speaking, the process represents an improvement of the process disclosed in British Pat. No. 1,101,560 and its equivalent U.S. Pat. No. 3,445,245, and the disclosures of those patents are, therefore, incorporated herein by this reference.

For the production of vinegar with an acetic acid concentration of more than 12 g/100 ml, it is known (from the above patents) to ferment a starting mash which contains live reproducing vinegar bacteria (Acetobacter) and is characterized by an acetic acid concentration of from 6 to 9 g/100 ml and an alcohol concentration of more than 4 vol.%, the mash being maintained under constant uniform aeration until during the course of the fermentation period an alcohol concentration of near 0 is reached. At that point, a part of the fermentation tank contents is removed as finished vinegar and replaced by a fresh mash with an acetic acid concentration of up to 2 g/100 ml and an alcohol concentration disclosed in the said British patent as being approximately 10 to 14 vol.% and in the said U.S. patent as being approximately 12 to 15 vol.%, the fresh mash being fed in slowly and under immediate internal mixing so that, after the introduction of the fresh mash, the starting acetic acid concentration and the starting alcohol concentration, respectively, are the same as during each previous fermentation period. These starting concentrations were selected because experiments had shown that the rate of reproduction of vinegar bacteria slows down correspondingly either at a constant alcohol concentration accompanied by a rising total concentration or at a constant total concentration accompanied by a rising acetic acid concentration and decreasing alcohol concentration. This is found to be so especially in a vinegar fermentation run at an acetic acid concentration above about 7 to 8 g/100 ml and at an alcohol concentration below about 5 to 6 vol.%, to an extent that the rate of reproduction under conditions of such acetic acid and alcohol concentrations reaches a maximum. Nevertheless, each fermentation cycle or period in this known process takes about 48 hours, with approximately 40% of the fermentation tank contents being removed as finished vinegar at each charge replacement.

However, even though the above-described process for producing vinegar with a more than 12 g/100 ml acetic acid concentration constituted a substantial technological advance, it is yet deemed desirable to increase the fermentation output or efficiency still further. The principal objective of the present invention, therefore, is the improvement of this process in such a manner as to increase the amount of vinegar produced per unit of time and per unit of volume of the fermenter, i.e. as to increase the productivity of the fermenter.

The objective of the present invention is achieved by virtue of the fact that at the end of each fermentation period only 20 to 40% of the fermenter contents are extracted as finished vinegar and replaced by fresh mash the acetic acid and alcohol concentrations of which are so predetermined that, after each fresh mash addition is completed, the starting concentrations for each new fermentation period are, respectively, more than 9 but less than 13 g/100 ml acetic acid and correspondingly less than 4 but more than 2.5 vol.% alcohol.

U.S. Pat. No. 4,076,844 discloses a two-stage process for producing vinegar with an acetic acid concentration of more than 15%, in which the total concentration is raised to above 15% in a first fermentation stage and is maintained constant at a level above 15% in a second fermentation stage, with 20 to 50% of the fermentation liquid being separated at the end of the first fermentation stage from the quantity of liquid remaining in the fermentation tank. In this process, therefore, at the time of such separation there is as yet no finished vinegar on hand which can be extracted and used. Moreover, the separated liquid is still characterized by an elevated alcohol concentration so that other relationships exist.

German Pat. No. 1,517,879 discloses a process for producing vinegar with a more than 12% acetic acid concentration by means of a single-stage process in which the starting concentrations for each fermentation period are in the range of 6 to 9 g/100 ml acetic acid and 4 to 7 vol.% alcohol. In this process approximately 40% of the fermentation tank contents are extracted at the end of each fermentation period and replaced by fresh mash.

The concept of increasing productivity by decreasing the quantity of liquid periodically extracted from and introduced into the fermentation tank, actually ran counter to all experience. Originally it had been the practice to extract from 50 to 60% of the fermentation tank contents (see O. Hromatka, Chemiker Zeitung 76, 776, 815, 1952). Subsequently this quantity was reduced to 50% (see O. Hromatka and H. Ebner, Ind. Eng. Chem. 51, 1279, 1959) and still later to 40% (see U.S. Pat. No. 3,445,245). A further reduction of the volume of liquid to be periodically extracted did not seem advisable, however, since this necessarily entails an increase in the acetic acid concentration and a decrease in the alcohol concentration at the end of each introduction of fresh mash. Both of these conditions lower the rate of reproduction of the vinegar bacteria. The latter must, of course, reproduce in each newly started fermentation period to again reach the number which they had before the start of the preceding extraction. Finally, it was known that a vinegar fermentation with a continuous introduction of mash and a continuous extraction of vinegar is feasible only at a total concentration below approximately 10%, since in the case of a total concentration above that level the rate of reproduction of the vinegar bacteria is so greatly reduced by the low alcohol concentration, which is maintained at approximately 0.3 vol.%, that such a fermentation ultimately comes to a halt. Since a continuous fermentation can actually be viewed as an extrapolation of a series of constantly decreasing fermentation periods, it was highly unlikely that the approach of the present invention would lead to a successful outcome.

Surprisingly, however, the result actually was an increase in productivity. Of significance for the achievement of this unexpected result is believed to be the fact that, because of the reduction of the volume of liquid extracted, a larger quantity of live and reproducing vinegar bacteria remain in the fermentation tank and that this compensates for the slowing down of the rate of reproduction. A further consideration is that more rapid changes in the alcohol as well as acetic acid concentrations exert a negative influence on the metabolism of the vinegar bacteria and that this influence is, by virtue of the reduced magnitude of the concentration changes in the case of reduced extraction volume, kept smaller. Through the conjoint action of these relationships, conditions apparently arise which make possible a substantial increase in the productivity. At starting concentrations of more than 9 g/100 ml acetic acid and less than 4 vol.% alcohol these conditions are optimal, as long as the acetic acid concentration does not exceed 13 g/100 ml and the alcohol concentration remains above 2.5 vol.%, and enable the fermentation period to be reduced from 48 hours to 27 hours.

A further, likewise unexpected, substantial increase in productivity resulted from the step that the aeration of the fermenter was so adjusted that the maximum hourly increase in acidity was at least 0.17 g/100 ml. Because of the volatility of alcohol and acetic acid, it is necessary to use an economical dosing of the air volume, which in U.S. Pat. No. 3,445,245 was determined to range between 2.5 and 6 $m^3$ per hour and per $m^3$ of fermentation volume. The given volume of aeration in this connection limits the possible number of vinegar bacteria that can form and in this way determines the maximum possible increase in acidity which, once reached, then remains constant for the remainder of the fermentation period. As further shown by the examples set forth in British Pat. No. 1,101,560, however, commercial fermenters have heretofore been limited to a maximum increase of acidity of 0.16 g/100 ml. Now it has been found surprisingly that an increase in the maximum hourly rise in acidity to more than 0.17 g/100 ml, preferably to 0.21 g/100 ml, which is feasible under the above set forth rates of aeration, in conjunction with the step of increasing the starting acetic acid concentration to more than 9 g/100 ml and decreasing the starting alcohol concentration to less than 4 vol.%, yields a further substantial increase of vinegar production per unit of time and per unit of volume.

If the reproduction of the vinegar bacteria is first arrested at higher output, i.e. at a larger number of bacteria in the fermentation volume, through the use of the suggested quantity of oxygen, then the duration of this arresting action from its onset to the end of the now shortened fermentation period takes a smaller interval of time. Since such an arresting action necessarily also detrimentally influences the metabolism of the vinegar bacteria, a reduction of the duration of the arresting action then again leads to advantageous conditions, so that it becomes possible through a combination of this approach with the first one described hereinbefore, to reduce the duration of an already reduced fermentation period from approximately 27 hours to 19 hours. As a result, as the following examples show, the fermentation output of the fermenter is increased to about 168% of the fermentation output of the fermenter shown in British Pat. No. 1,101,560.

EXAMPLE I

In a fermentation tank of 3 m diameter and 5 m height, which was equipped with an aeration device, a cooling device, a control thermometer and a mechanical defoamer, a vinegar fermentation was carried out at an aeration rate of 90 $m^3$/hr at the following values, with the liquid content in the tank being 24,000 liters.

| Time (hours) | Acetic Acid (g/100 ml) | Alcohol (Vol. %) | Total Concen. (%) | Ferment. output (g/100 ml/hr) |
|---|---|---|---|---|
| 0 | 14.30 | 0.20 | 14.50 | 0.16 |

This time point represents the stage at which 6500 liters of vinegar were extracted from the tank, and this was immediately followed by an introduction of 6500 liters of fresh mash having a 1 g/100 ml acetic acid concentration and a 14.0 vol.% alcohol concentration and containing 1.5 g/l nutrients.

| Time (hours) | Acetic Acid (g/100 ml) | Alcohol (Vol. %) | Total Concen. (%) | Ferment. output (g/100 ml/hr) |
|---|---|---|---|---|
| 2 hrs | | | | |

This time point represents the end of the introduction of the fresh mash.

| Time (hours) | Acetic Acid (g/100 ml) | Alcohol (Vol. %) | Total Concen. (%) | Ferment. output (g/100 ml/hr) |
|---|---|---|---|---|
| 3 hrs | 10.93 | 3.70 | 14.63 | — |
| 17 hrs | 12.70 | 1.85 | 14.55 | 0.126 |
| 27 hrs | 14.30 | 0.20 | 14.50 | 0.16 |

At this point in time again 6500 liters of vinegar were extracted and immediately thereafter 6500 liters of fresh mash were introduced into the tank, as set forth above.

The fermentation periods were so interlinked that every 27 hours it was possible to extract 6500 liters of vinegar with an acetic acid concentration of 14.30 g/100 ml, which corresponds to a fermentation efficiency of 809 liters of alcohol per 24 hours. Vis-a-vis the process of British Pat. No. 1,101,560, therefore, it was possible through the approach of the present invention, entailing a change in the acetic acid and alcohol concentrations at the start of the successive fermentation periods, to achieve an increase of the fermentation output of the fermenter to 119% of that disclosed in the said British patent. There the fermentation efficiency in the same fermenter amounted to 682 liters of alcohol per 24 hours.

EXAMPLE II

In the same fermentation tank as described in connection with Example I and having a liquid content of 24,000 liters but with an enhanced rate of aeration of 105 $m^3$/hr, the following vinegar fermentation was carried out:

| Time (hours) | Acetic Acid (g/100 ml) | Alcohol (Vol. %) | Total Concen. (%) | Ferment. output (g/100 ml/hr) |
|---|---|---|---|---|
| 0 | 14.30 | 0.20 | 14.50 | 0.21 |

At this point in time 6500 liters of vinegar were extracted from the tank, and this was immediately followed by an introduction of 6500 liters of fresh mash having a 1 g/100 ml acetic acid concentration and a 14.0 vol.% alcohol concentration and containing 1.5 g/l nutrients.

| Time (hours) | Acetic Acid (g/100 ml) | Alcohol (Vol. %) | Total Concen. (%) | Ferment. output (g/100 ml/hr) |
|---|---|---|---|---|
| 2 hrs | | | | |

This time point represents the end of the introduction of the fresh mash.

| Time (hours) | Acetic Acid (g/100 ml) | Alcohol (Vol. %) | Total Concen. (%) | Ferment. output (g/100 ml/hr) |
|---|---|---|---|---|
| 3 hrs | 11.03 | 3.60 | 14.63 | — |
| 15 hrs | 13.45 | 1.05 | 14.50 | 0.20 |
| 19 hrs | 14.30 | 0.20 | 14.50 | 0.21 |

At this point in time again 6500 liters of vinegar were extracted and immediately thereafter 6500 liters of fresh mash were introduced into the tank, as set forth above.

The fermentation periods in Example II were so interlinked that every 19 hours it was possible to extract 6500 liters of vinegar with an acetic acid concentration of 14.30 g/100 ml, which corresponds to a fermentation efficiency of 1149 liters of alcohol per 24 hours. Via-a-vis the process of British Pat. No. 1,101,560, therefore, it was possible to achieve an increase of the productivity to 168%.

By virtue of the steps of the present invention, the negative influences of the mash introduction stage and the lack of oxygen on the metabolism of the vinegar bacteria are so reduced that the fermenter runs almost the entire time at full efficiency and thus provides the highest possible productivity. In addition, with the utilization of these smaller fermentation periods the principal advantage of a semi-continuous operation, vis-a-vis a continuous operation, is retained, namely that the increased alcohol concentration and reduced acetic acid concentration achieved upon each introduction of fresh mash stimulate the rate of reproduction of the vinegar bacteria.

It will be understood that the foregoing description of preferred embodiments of the present invention is for purposes of illustration only, and that the various features of the processes herein disclosed are susceptible to a number of modifications and changes none of which entails any departure from the spirit and scope of the present invention as defined in the hereto appended claims.

What is claimed is:

1. In a process for the production of vinegar with an acetic acid concentration of more than 12 g/100 ml by means of a single-stage submerged fermentation of alcohol-containing mashes in successive fermentation periods, in each of which a portion of the finished vinegar is extracted from the fermentation tank and replaced by a like quantity of fresh mash having an acetic acid concentration of up to 2 g/100 ml, an alcohol concentration of more than 10 vol.%, and a total concentration of more than 12.5%;

the improvement comprising the steps of:
  (a) extracting from the tank, at the end of each of the successive fermentation periods and prior to the introduction of fresh mash into the tank, a quantity of finished vinegar, constituting between about 20% and less than 40% of the contents of the fermentation tank;
  (b) introducing into the fermentation tank, after the extraction of said quantity of finished vinegar and to replace the same, a like quantity of fresh mash having acetic acid and alcohol concentrations which are so chosen that, at the start of each of the successive fermentation periods, by virtue of the commingling of the added fresh mash with the fermenting liquid remaining in the tank, the resultant acetic acid concentration of the augmented contents of the tank is more than 9 g/100 ml and less than 13 g/100 ml, and concomitantly the resultant alcohol concentration of the augmented contents of the tank is less than 4 vol.% and more than 2.5 vol.%; and
  (c) conducting each of the successive fermentation periods at an aeration rate sufficient to provide a maximum hourly increase in acidity of about 0.17 g/100 ml to about 0.21 g/100 ml.

* * * * *